Figure 1:
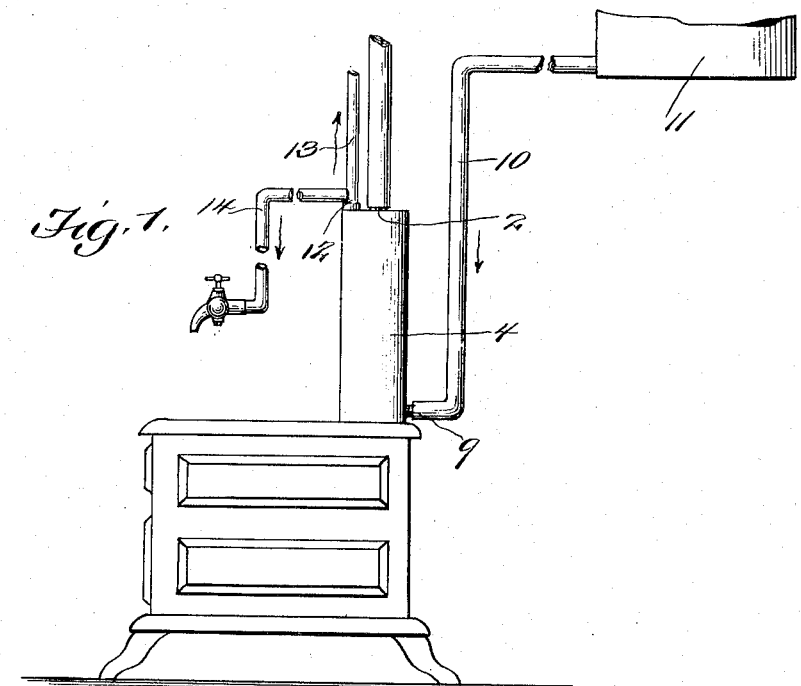

W. G. GARRARD.
STOVEPIPE WATER HEATER.
APPLICATION FILED AUG. 10, 1911.

1,038,113.

Patented Sept. 10, 1912.

Witnesses
Francis G. Boswell
C. E. Frothingham

Inventor
W. G. Garrard,
By D. Swift & Co.
Attorney

UNITED STATES PATENT OFFICE.

WILLEY G. GARRARD, OF SNYDER, TEXAS.

STOVEPIPE WATER-HEATER.

1,038,113.   Specification of Letters Patent.   Patented Sept. 10, 1912.

Application filed August 10, 1911. Serial No. 643,367.

*To all whom it may concern:*

Be it known that I, WILLEY G. GARRARD, a citizen of the United States, residing at Snyder, in the county of Scurry and State of Texas, have invented a new and useful Stovepipe Water-Heater; and I do hereby declare the following to be a full, clear, and exact description of the invention, such as will enable others skilled in the art to which it appertains to make and use the same.

This invention relates to that class of water heaters commonly called "stovepipe" water heaters.

The invention further pertains to a new and useful water heater of this nature, comprising but a few parts, namely, an inner and outer casing, including a water space between them, an inlet and an outlet, and an extension, adapted to fit the stovepipe as shown in the drawings.

An object of the invention is to arrange the water supply tank at a height considerably greater than the height of the heater, so that the water pressure will be great enough to supply the water to the necessary parts of a dwelling.

The invention comprises further features and combination of parts, as hereinafter set forth, shown in the drawings and claimed.

Figure 2:
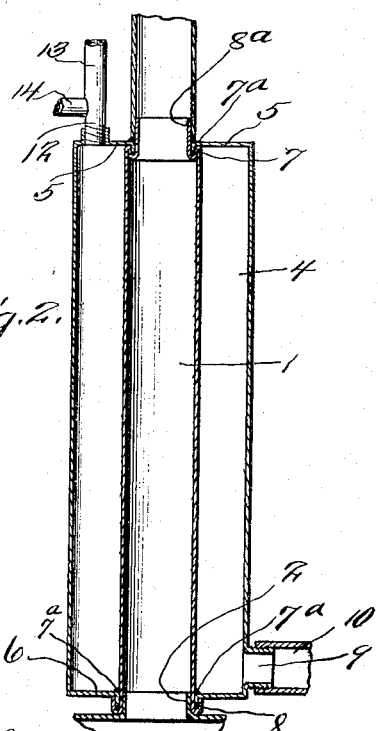
Figure 3:
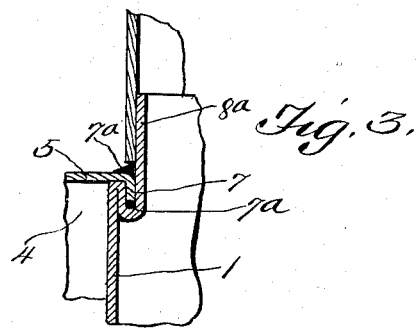
Figure 4:
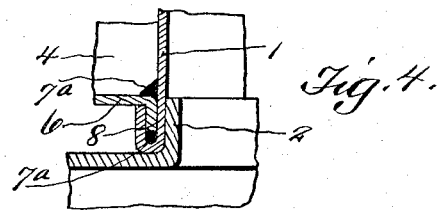

In the drawings:—Figure 1 is a view in elevation, showing the improved heater as applied to a stove or range, the same being constructed in accordance with the invention. Fig. 2 is a vertical sectional view through the heater. Figs. 3 and 4 are detail views.

Referring more particularly to the drawings 1 designates the inner casing of the heater, which is of a diameter similar to that of the usual stovepipe. This inner casing is adapted to fit the usual collar 2 of the stove or range. Surrounding the inner casing and spaced apart therefrom is an outer casing 4, which is provided at the top and bottom thereof with annular flanges 5 and 6. These flanges terminate to form flanged annular openings to receive the inner casing 1, and are connected to the inner casing by slip joints 7 and 8, so that the outer casing may be readily connected to the inner casing, there being the necessary soldering material 7ª applied to these joints, thus insuring the heater against leakage. The flanged opening at the bottom of the outer casing is of larger diameter than the upper flanged opening, thereby rendering it possible to fit and connect the outer casing over and to the inner casing. The inner casing projects slightly beyond the upper flange, as shown at 8ª, for the purpose of receiving the usual stovepipe.

The water to be heated enters the water space between the inner and outer casings, by way of the inlet 9, which connects with the supply pipe 10 of supply tank 11, which supply tank may be arranged at any desirable height. However, a supply tank should be arranged at such a height, that the water pressure will be great enough, so as to supply the water to the desired location. The outlet pipe 12 is arranged at the top portion of the outer casing, whereby the hot water on top may be drawn off, without the lower strata of cold water being utilized. Branching from the outlet pipe are two pipes 13 and 14, the pipe 13 is adapted to extend to various portions through a dwelling, while the pipe 14 is provided with a valve, and is adapted to empty adjacent the range or stove or over the sink.

From the foregoing it will be observed that there has been produced a novel, simple and efficient stovepipe water heater, and one which has been found to be practicable, and easily and quickly applied.

The invention having been set forth, what is claimed as new and useful is:—

In combination, an inner and an outer casing having an annular water space therebetween, the inner casing being folded upon itself at its upper and lower ends to form grooves, while the other casing is provided with top and bottom inturned annular flanges terminating in annular flanged openings, the lower one of which being of larger diameter than the upper one to readily receive the inner casing, the flanges of the openings being received by the grooves thus affording slip joints between the casings, and means for adhering the joints together securely.

In testimony whereof I have signed my name to this specification in the presence of two subscribing witnesses.

WILLEY G. GARRARD.

Witnesses:
W. W. DAVIS,
S. J. CASITEVERN.